United States Patent
Yamamoto et al.

(12) 
(10) Patent No.: US 6,260,642 B1
(45) Date of Patent: Jul. 17, 2001

(54) STEERING CONTROL SYSTEM FOR TRACKLAYING VEHICLE

(75) Inventors: Shigeru Yamamoto; Koji Okazawa; Satoru Morita, all of Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/428,539

(22) Filed: Oct. 28, 1999

(30) Foreign Application Priority Data

Dec. 21, 1998 (JP) .................................................. 10-362469

(51) Int. Cl.[7] ...................................................... B62D 11/02
(52) U.S. Cl. ................................................. 180/6.7; 37/348
(58) Field of Search ..................................... 180/6.48, 6.7, 180/308, 333; 37/301, 382; 701/501, 67, 70, 71, 78, 81; 172/2, 3, 4.5, 831, 812

(56) References Cited

U.S. PATENT DOCUMENTS 5,462,122 * 10/1995 Yamamoto ................................ 172/2
5,555,942 * 9/1996 Matsushita ............................... 172/3

FOREIGN PATENT DOCUMENTS

| 3-90484 | 4/1991 | (JP) . |
| 4-366232 | 12/1992 | (JP) . |
| 5-8753 | 1/1993 | (JP) . |
| 9-71262 | 3/1997 | (JP) . |

* cited by examiner

*Primary Examiner*—Christopher P. Schwartz
*Assistant Examiner*—C. T. Bartz
(74) *Attorney, Agent, or Firm*—Armstrong, Westerman, Hattori, McLeland & Naughton, LLP

(57) ABSTRACT

The modulation characteristic (static characteristic or dynamic characteristic) of a clutch and a brake are changed according to various operating conditions of a vehicle such as a high load driving state, slope traveling state, low engine speed state, and high speed driving state, to enable optimum steering performance that matches each operating condition of the tracklaying vehicle.

6 Claims, 9 Drawing Sheets

MODULATION CHARACTERISTIC OF CLUTCH AND BRAKE
(BASIC STEERING STATIC CHARACTERISTIC)

STEERING STATIC CHARACTERISTIC FOR SLOPES

STEERING CONTROL SYSTEM FOR TRACKLAYING VEHICLE

TECHNICAL FIELD

The present invention relates to a steering control system for tracklaying vehicles such as bulldozers.

BACKGROUND ART

There is known a steering control system for a tracklaying vehicle such as bulldozers, in which a clutch and a brake are provided for each of the right and left drive wheels of the vehicle and controlled to cause right and left turns of the vehicle. In such a steering control system, when operating the steering lever so as to cause a right turn during traveling of the vehicle, the right clutch is disengaged and the right brake is actuated to stop only the right crawler belt, so that the vehicle turns to the right. Similarly, when operating the steering lever to cause a left turn, the left clutch is disengaged and the left brake is actuated to stop only the left crawler belt, so that the vehicle turns to the left.

The above steering control system is designed such that there is a predetermined time interval after clutch disengagement until brake actuation, or after brake release until clutch engagement, which relieves shocks occurring during steering control so that smooth turns can be carried out. If this time interval between clutch disengagement and brake actuation or between brake release and clutch engagement is made to be constant, it will cause a time period when the clutch and brake which have been operated by the steering lever are both in their released states during traveling of the vehicle on a slope, with the result that the vehicle undesirably turns in a direction opposite to a direction designated by operating the steering lever, due to the so-called "reverse steering phenomenon".

An attempt to solve the above problem is disclosed, for instance, in Japanese Patent Publication (KOKAI) No. 4-366232 (1992) in which the time intervals between clutch disengagement and brake actuation and between brake release and clutch engagement are controlled according to the pitch forward or pitch aft angle of the vehicle with intent to prevent shocks occurring during operation of the steering lever and to prevent the reverse steering phenomenon.

A steering control system directed to performing smooth turns without shocks under various driving and operating conditions is disclosed, for instance, in Japanese Patent Publication (KOKAI) No. 5-8753 (1993) according to which, a time interval until a start of brake actuation or until a start of clutch engagement is automatically adjusted according to the operation speed of the steering lever, thereby achieving improved fine controllability.

These conventional steering control systems are, however, not designed to perform steering control taking into consideration the operating state of the tracklaying vehicle such as bulldozer's dozing operation and high speed driving state, and therefore this system cannot provide optimum control suited for each operating state. Another problem of these conventional control systems is such that since the control is designed mainly in view of the static characteristic of the clutches and brakes, it cannot achieve smooth and reliable turning control suited for each operating state.

The present invention is directed to overcoming the foregoing problems and a prime object of the invention is therefore to provide a steering control system for a tracklaying vehicle, which enables optimum steering performance according to various operating conditions of the tracklaying vehicle.

DISCLOSURE OF THE INVENTION

The above object can be accomplished by a steering control system for a tracklaying vehicle according to a first aspect of the invention (related to claim 1). This steering control system for a tracklaying vehicle comprises a clutch and a brake provided for each of right and left drive wheels, electronic proportional control valves for controlling the clutches and the brakes, a steering lever, a steering command signal generator for generating a steering command signal according to the operating amount of the steering lever, and a controller for outputting a steering control signal to the electronic proportional control valves based on the output of the steering command signal generator, wherein tractive force detecting means for detecting the tractive force of the vehicle is provided and wherein if the tractive force detecting means determines that the vehicle is in a high load driving state, the controller outputs a steering control signal to the electronic proportional control valves in order to obtain a hydraulic characteristic for expanding the controlling region of a clutch and reducing the controlling region of a brake.

According to the first aspect of the invention, when little tractive force is imposed on the vehicle, that is, when the vehicle is turning during travel at a flat place, the turning torque of the inner crawler belt has a minus value while the turning torque of the outer crawler belt has a plus value so that the controlling region of a clutch is set to be small and the controlling region of a brake is set to be large. On the other hand, if the vehicle is in a high load state in which the vehicle is subjected to great tractive force, for instance, when the vehicle turns with high load being imposed on the blade in dozing operation, the controlling region of a clutch is expanded while the controlling region of a brake is reduced. In this way, the turning torque of the inner crawler belt has a plus value, maintaining a half-engaged clutch condition for long. In consequence, soil pushing by the front face of the blade can be smoothly carried out and an optimum turning characteristic free from shocks can be attained even in dozing operation.

According to a second aspect of the invention (related to claim 2), there is provided a steering control system for a tracklaying vehicle comprising a clutch and a brake provided for each of right and left drive wheels, electronic proportional control valves for controlling the clutches and the brakes, a steering lever, a steering command signal generator for generating a steering command signal according to the operating amount of the steering lever, and a controller for outputting a steering control signal to the electronic proportional control valves based on the output of the steering command signal generator, wherein pitch angle detecting means for detecting the pitch forward or pitch aft angle of the vehicle is provided and wherein if the pitch angle detecting means determines that the vehicle is in a slope traveling state, the controller outputs a steering control signal to the electronic proportional control valves in order to obtain a hydraulic characteristic for inhibiting simultaneous release of a clutch and a brake.

According to the second aspect of the invention, if the vehicle is in a slope traveling state, a hydraulic characteristic for inhibiting simultaneous release of a clutch and a brake is obtained. In other words, control is so performed in a slope traveling state as to eliminate the disengaged region of a clutch to increase the braking force of a brake. Therefore, reverse turning (i.e., reverse steering) due to clutch disengagement during the descent of the vehicle on a slope and excessively large turning radius occurring during the ascent of the vehicle on a slope can be avoided so that an improved turning characteristic for the slope traveling state can be achieved.

In the second aspect of the invention, it is preferable that if the pitch angle detecting means determines that the vehicle is in the slope traveling state, the controller outputs a steering control signal to the electronic proportional control valves in order to obtain a hydraulic characteristic for setting the value of oil pressure for starting clutch disengagement and the value of oil pressure for starting brake actuation to be lower than those of normal driving (this feature corresponds to claim 3). With this arrangement, clutching force and braking force can be corrected so as to increase, so that when driving on a slope, the operator can carry out steering operation with steering feeling similar to the feeling when driving on a flat place.

According to a third aspect of the invention (related to claim 4), there is provided a steering control system for a tracklaying vehicle comprising a clutch and a brake provided for each of right and left drive wheels, electronic proportional control valves for controlling the clutches and the brakes, a steering lever, a steering command signal generator for generating a steering command signal according to the operating amount of the steering lever, and a controller for outputting a steering control signal to the electronic proportional control valves based on the output of the steering command signal generator, wherein rotation detecting means for detecting the rotational speed of an engine or a torque converter is provided and wherein if the rotation detecting means determines that the engine is in a low speed rotating state, the controller outputs a steering control signal to the electronic proportional control valves in order to obtain a hydraulic characteristic for setting the value of oil pressure for starting brake actuation to be higher than that of normal driving.

According to the third aspect of the invention, when the engine is in a low speed rotating state, the value of oil pressure for starting brake actuation is set to be higher than that of normal driving, thereby reducing braking force. This makes it possible to carry out accurate steering control in compliance with fine operation, with a prompt braking characteristic.

According to a fourth aspect of the invention (related to claim 5), there is provided a steering control system for a tracklaying vehicle comprising a clutch and a brake provided for each of right and left drive wheels, electronic proportional control valves for controlling the clutches and the brakes, a steering lever, a steering command signal generator for generating a steering command signal according to the operating amount of the steering lever, and a controller for outputting a steering control signal to the electronic proportional control valves based on the output of the steering command signal generator, wherein tractive force detecting means for detecting the tractive force of the vehicle and pitch angle detecting means for detecting the pitch forward or pitch aft angle of the vehicle are provided and wherein if the tractive force detecting means determines that the vehicle is in a high load driving state or the pitch angle detecting means determines that the vehicle is in a slope ascending state, the controller outputs a steering control signal to the electronic proportional control valves in order to obtain a hydraulic characteristic for setting the time-relating change rate of clutch oil pressure after a start of clutch engagement until completion of the clutch engagement to be higher than that of normal driving, during operation for shifting the steering lever from its full stroke position to its neutral position.

According to the fourth aspect of the invention which focuses on the dynamic characteristic of clutches and brakes, if the vehicle is in a high load driving state or a slope ascending state, the time-relating change rate of clutch oil pressure after a start of clutch engagement until completion of the clutch engagement is set to be higher than that of normal driving, during operation for shifting the steering lever from its full stroke position to its neutral position, so that clutch engagement can be carried out in a short time. With this arrangement, torque is not discontinued when the vehicle is in the high load driving state, the reverse steering phenomenon does not occur when the vehicle is in the slope ascending state, shocks which would occur during a shift from a turning state to a straight-ahead driving state can be reduced, and a smooth turning characteristic without inertial turning can be obtained.

According to a fifth aspect of the invention (related to claim 6), there is provided a steering control system for a tracklaying vehicle comprising a clutch and a brake provided for each of right and left drive wheels, electronic proportional control valves for controlling the clutches and the brakes, a steering lever, a steering command signal generator for generating a steering command signal according to the operating amount of the steering lever, and a controller for outputting a steering control signal to the electronic proportional control valves based on the output of the steering command signal generator, wherein vehicle speed detecting means for detecting the driving speed of the vehicle is provided and wherein if the vehicle speed detecting means determines that the vehicle is in a high speed driving state, the controller outputs a steering control signal to the electronic proportional control valves in order to obtain a hydraulic characteristic for setting the time-relating change rate of clutch oil pressure after a start of clutch engagement until completion of the clutch engagement to be lower than that of normal driving, during operation for shifting the steering lever from its full stroke position to its neutral position.

According to the fifth aspect of the invention which also focuses on the dynamic characteristic of clutches and brakes, if the vehicle is in a high speed driving state, the time-relating change rate of clutch oil pressure after a start of clutch engagement until completion of the clutch engagement is set to be lower than that of normal driving, during operation for shifting the steering lever from its full stroke position to its neutral position, so that clutch engagement can be slowly carried out. With this arrangement, shocks caused by the inertia of the vehicle when shifting from the turning state to the straight-ahead driving state can be reduced and a smooth turning characteristic without inertial turning can be obtained.

BRIEF DESCRIPTION OF THE DRAWINGS

FIG. 3(b) is a graph showing the relationship between clutching force and oil pressure.

FIG. 3(c) is a graph showing the relationship between braking force and oil pressure.

BEST MODE FOR CARRYING OUT THE INVENTION

Figure 1:
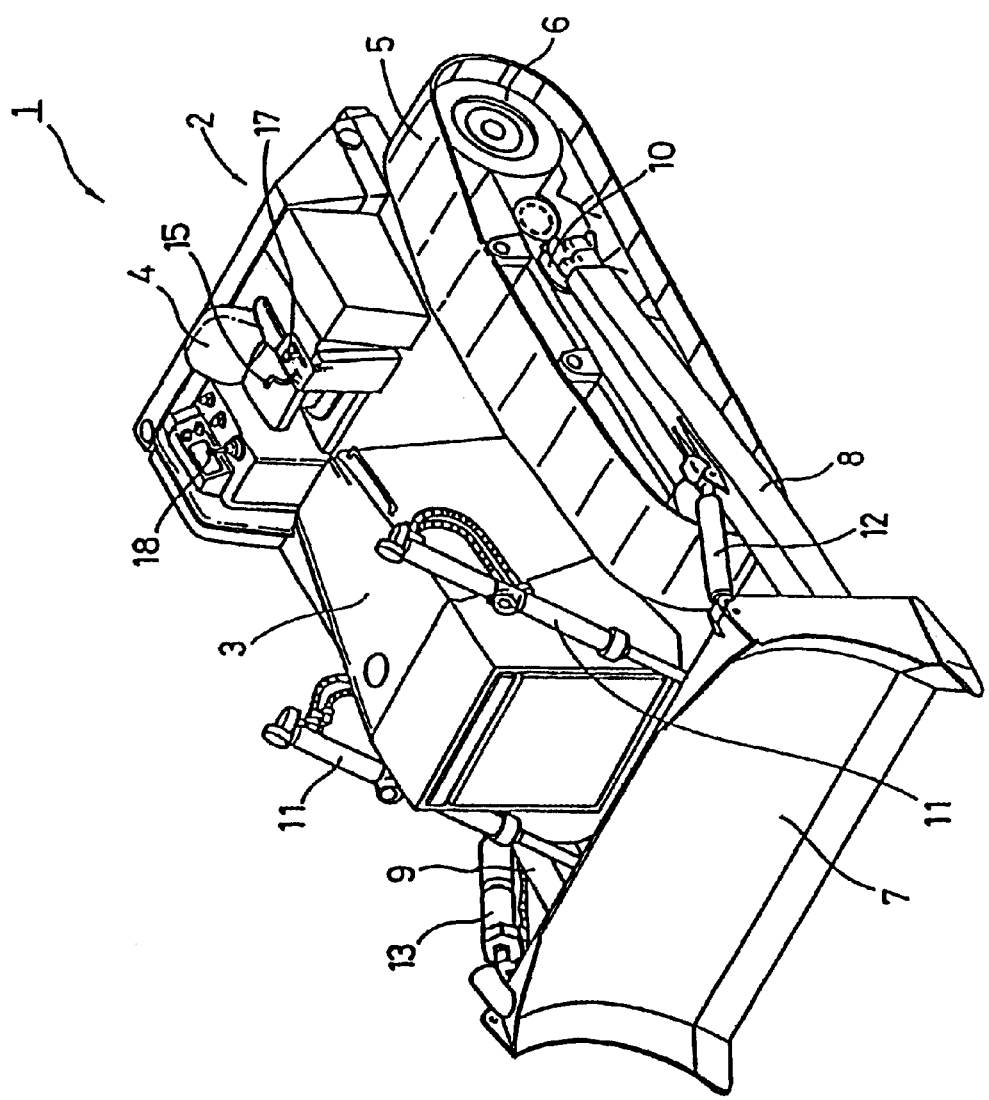
FIG. 1 is an outside view of a bulldozer constructed according to one embodiment of the invention.

Referring now to the drawings, a steering control system for a tracklaying vehicle will be described according to a preferred embodiment of the invention.

Described below is one embodiment in which the invention is applied to a bulldozer. FIG. 1 shows the external appearance of a bulldozer associated with an embodiment of the invention.

In the bulldozer 1 of the present embodiment, there are provided a bonnet 3 and a cab 4 on a vehicle body 2. Disposed on both right and left sides of the vehicle body 2 when viewed in the forward driving direction of the vehicle body 2 are crawler belts 5 for driving the vehicle body 2 so as to travel forwardly and reversely and turn. The crawler belts 5 are respectively independently driven by driving power transmitted from an engine with the aid of their associated sprockets 6.

A blade 7 is supported at the leading ends of right and left straight frames 8, 9 the base ends of which are, in turn, pivotally supported at the right and left sides of the vehicle body 2 through trunnions 10 (the trunnion on the right side is not shown in the drawing) such that the blade 7 can be raised or lowered. A pair of side-by-side blade lift cylinders 11 are arranged between the blade 7 and the vehicle body 2, for raising or lowering the blade 7. A brace 12 and a blade tilt cylinder 13 are provided for laterally tilting the blade 7, with the former being positioned between the left straight frame 8 and the blade 7 and the latter being positioned between the right straight frame 9 and the blade 7.

Positioned on the left side of the cab 4 are a steering lever 15 which also serves as a gear shift lever for forward and reverse drives and a fuel controlling lever 17. On the right side of the cab 4, there is provided a blade controlling lever 18 or the like for raising, lowering, left-tilting and right-tilting the blade 7. Although not shown in the drawing, there is provided a decelerator pedal in front of the cab 4.

Figure 2:
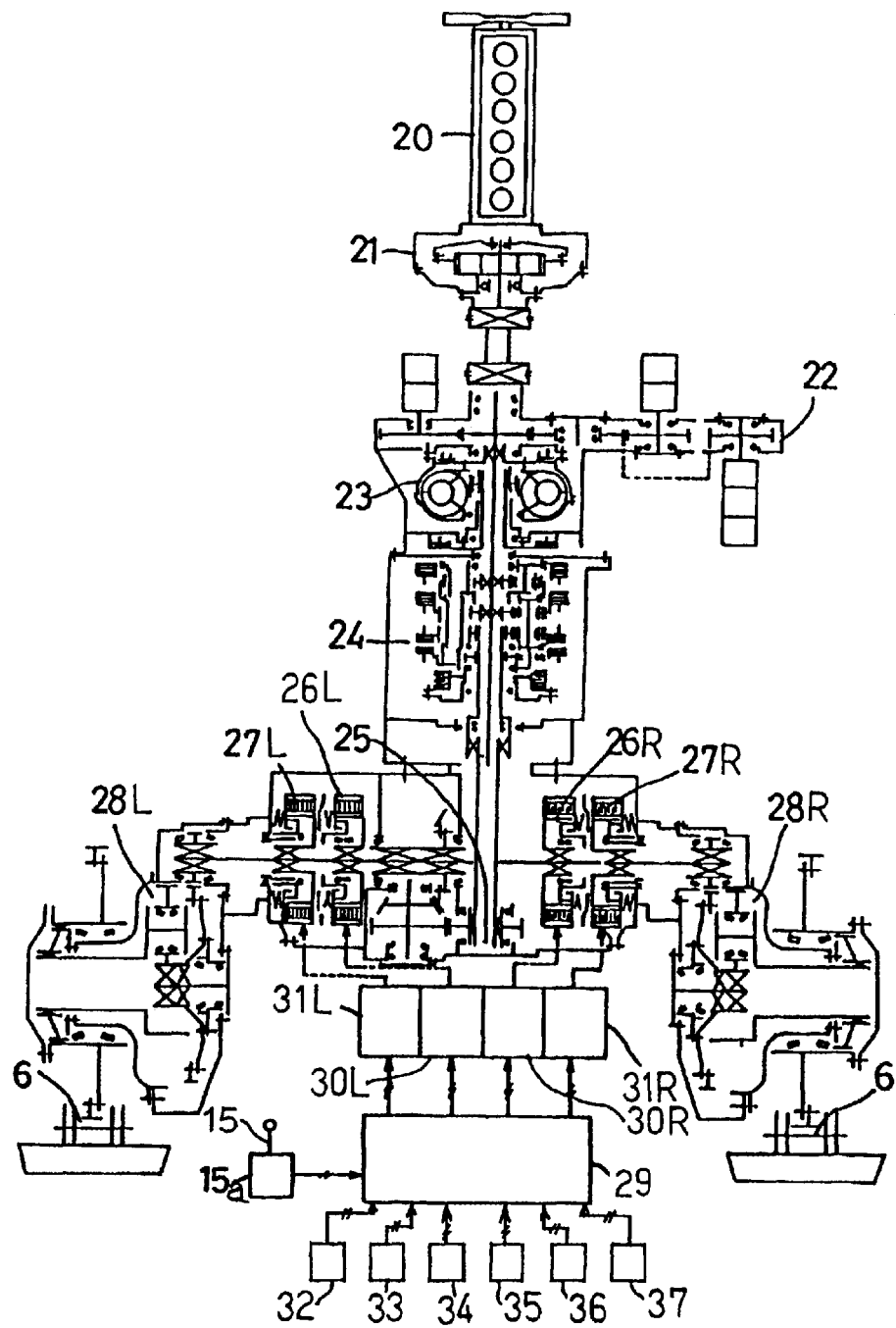
FIG. 2 shows the system configuration of the embodiment.

Referring to FIG. 2 which shows the system configuration of the present embodiment, the rotary driving force of the engine 20 is transmitted to a torque converter 23 through a damper 21 and a PTO 22. The rotary driving force is then transmitted from the output shaft of the torque converter 23 to a transmission 24 (e.g., wet multiple disc clutch type planetary gear transmission) which has an input shaft connected to the output shaft of the torque converter 23. The transmission 24 comprises a forward drive clutch, a reverse drive clutch and first to third speed clutches, so that the rotary driving force from the output shaft of the transmission 24 is transmitted to paired right and left final reduction gear mechanisms 28L, 28R through a transfer 25, right and left steering clutches 26L, 26R, and brakes 27L, 27R to power the respective sprockets 6 for running the crawler belts 5.

The clutches 26L, 26R and the brakes 27L, 27R are actuated by the energizing force of springs, released by oil pressure, and controlled, in response to a control signal output from a controller 29, through right and left electromagnetic proportional control valves 30L, 30R for the clutches and right and left electromagnetic proportional control valves 31L, 31R for the brakes, respectively. For executing this control, the controller 29 inputs a signal from a steering command signal generator 15a which generates a steering command signal according to the operating amount of the steering lever 15. The controller 29 also inputs the following data: (i) engine speed data which is associated with the engine speed of the engine 20 and sent from an engine speed sensor 32; (ii) rotation data which is associated with the rotational speed of the output shaft of the torque converter 23 and sent from a torque converter output shaft rotation sensor 33; (iii) pitch angle data which is associated with the pitch forward or pitch aft angle of the vehicle and sent from a pitch angle sensor 34; (iv) rotation data which is associated with the rotational speed of the output shaft of the transmission 24 and sent from a transmission output shaft rotation sensor 35; (v) data which is associated with speed conditions and sent from a transmission gear shift sensor 36; and (vi) data which is associated with the throttle amount of the engine 20 and sent from a throttle sensor 37.

Figure 3:
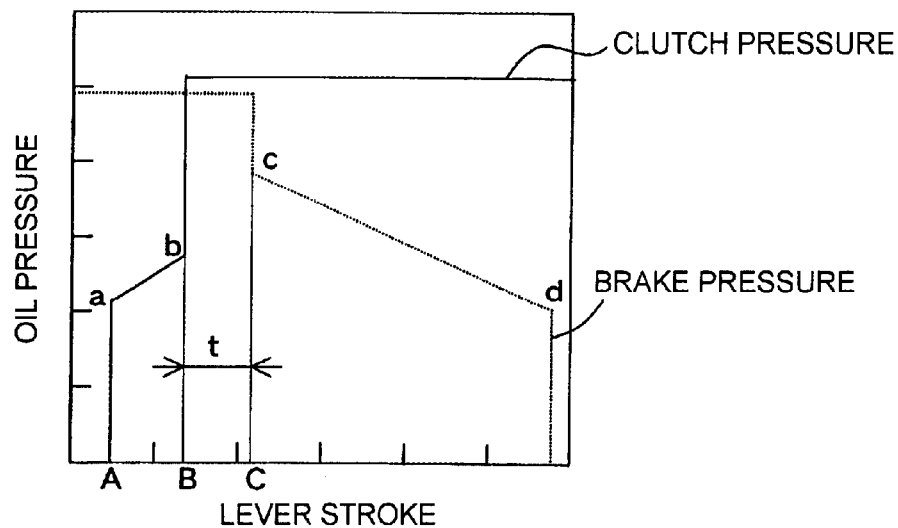
FIG. 3(*a*) is a graph showing a modulation characteristic of a clutch and a brake.
Figure 3:
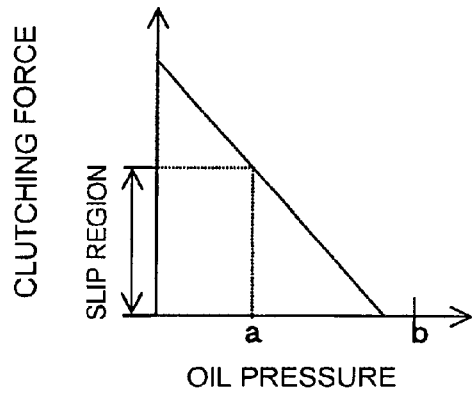
Figure 3:
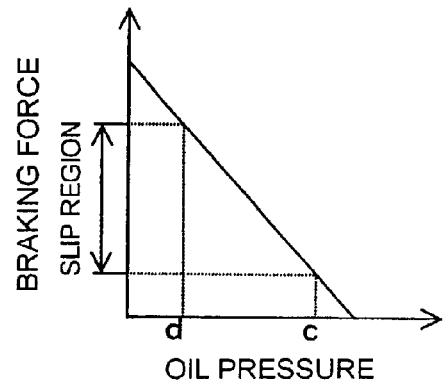

FIG. 3(a) shows, a modulation characteristic, namely, the relationship between the stroke of the steering lever 15 during normal driving of the bulldozer and oil pressures (holding pressures) for a clutch and a brake. FIGS. 3(b) and 3(c) show the relationship between clutching force and oil pressure and the relationship between braking force and oil pressure, respectively. Referring to these graphs, the control characteristics of clutch pressure and brake pressure obtained by operating the steering lever 15 will be described.

As shown in FIG. 3(a), firstly, the clutches are in their engaged state by the energizing force of the springs, with no pressure oil supplied thereto, while the brakes are in their OFF state, supplied with pressure oil so that the vehicle is driven straight ahead. When operating the steering lever 15, pressure oil is supplied to either of the clutches at Point A to increase oil pressure to Point a. From Point a to Point b, engaging force is gradually reduced and clutching force becomes zero at the point slightly before Point b (see FIG. 3(b)). As to the brakes, pressure oil is removed from either brake to let oil pressure decrease to Point c from which braking force is increased gradually in a direction toward Point d and the brake is brought into engagement at Point d (see FIG. 3(c)). In this case, there is provided a delay time t between Point b and Point c to bring the brake into its ON state after disengagement of the clutch. When releasing the brake and then engaging the clutch, a delay time is set so as to engage the clutch after releasing the brake. With this arrangement, shocks which would occur during the operation are avoided.

Figure 4:
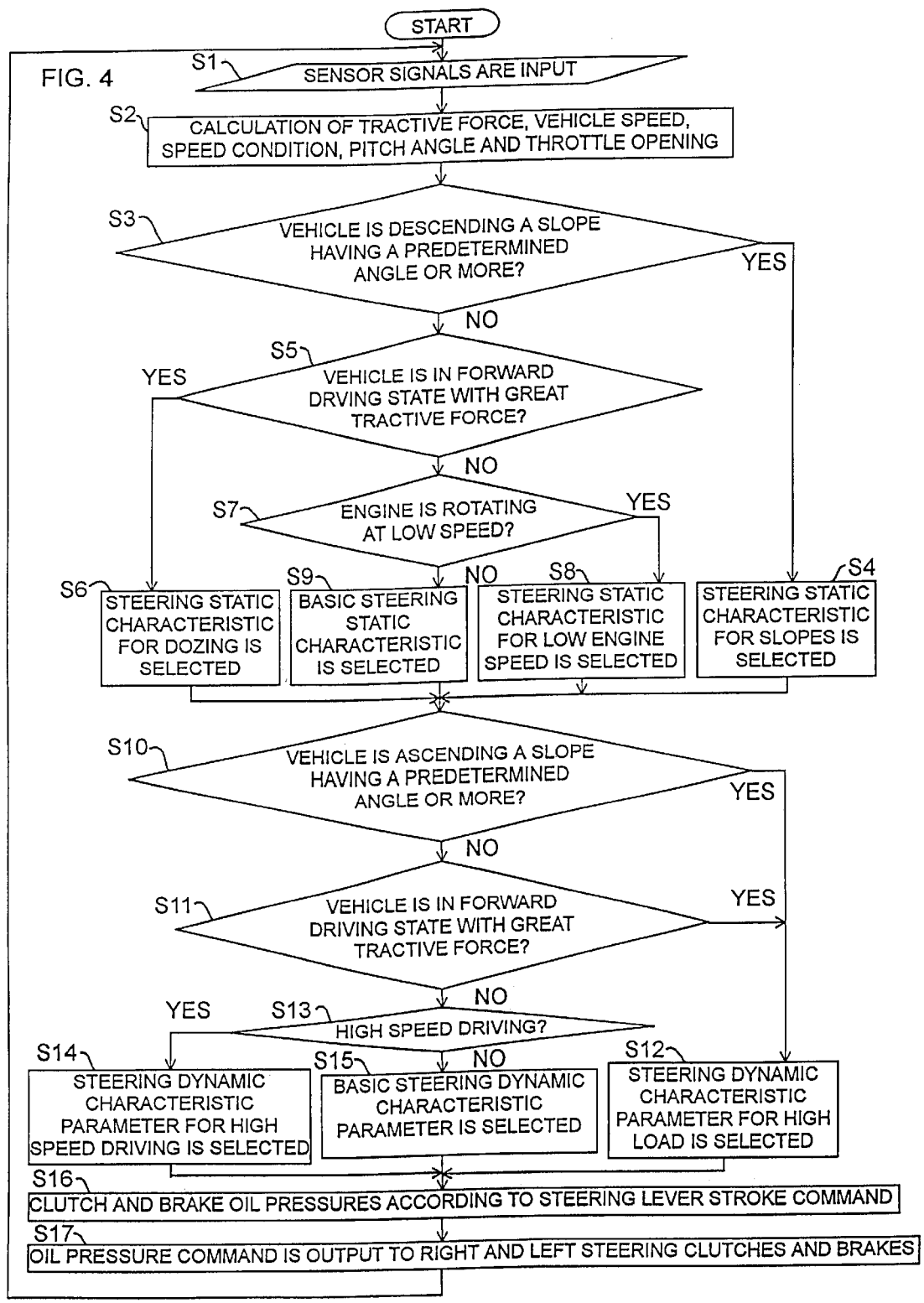
FIG. 4 is a flow chart showing the procedure of steering control.

In this embodiment, steering control is performed by changing the static characteristic and dynamic characteristic in relation to the above hydraulic characteristic (static characteristic) of a clutch/brake for normal driving, according to the operating state of the bulldozer. Reference is now made to the flow chart of FIG. 4 to concretely describe the steering control of the present embodiment.

Steps S1 and S2: In addition to a steering lever stroke signal from the steering command signal generator 15a, the following sensor signals are input: (i) an engine speed signal representative of the engine speed of the engine 20 and sent from the engine speed sensor 32; (ii) a rotation signal representative of the rotational speed of the output shaft of the torque converter 23 and sent from the torque converter output shaft rotation sensor 33; (iii) a pitch angle signal representative of the pitch forward or pitch aft angle of the vehicle and sent from the pitch angle sensor 34; (iv) a rotation signal representative of the rotational speed of the output shaft of the transmission 24 and sent from the transmission output shaft rotation sensor 35; (v) a gear shift signal from the transmission gear shift sensor 36; and (vi) a signal representative of the throttle amount of the engine 20 and sent from the throttle sensor 37. Then, the tractive force of the vehicle is calculated based on the signal associated with the engine speed of the engine 20 and the signal associated with the rotational speed of the output shaft of the torque converter 23. The pitch angle of the vehicle is calculated based on the pitch angle signal and vehicle speed is calculated based on the signal associated with the rotational speed of the output shaft of the transmission 24.

Step S3: It is then determined from the calculated pitch angle whether or not the vehicle is in a slope descending state where the vehicle is descending a slope having a predetermined angle (e.g., 6 degrees) or more.

Step S4: If the vehicle is in the slope descending state with a slope angle no less than the predetermined value, a steering static characteristic for slopes is selected as the modulation characteristic of a clutch and a brake, in view of the fact that the torque required for turning the inner crawler belt has a large minus value when the vehicle is in the slope descending state. This steering static characteristic for slopes is such a hydraulic characteristic as shown in FIG. 5(a) in which the control of the brake is put forward relative to the characteristic (indicated by chain line) of normal driving (see arrow P), so that there is not a region (i.e., idle region) where the clutch and brake are both released. In this way, an occurrence of turning in a reverse direction (i.e., reverse steering phenomenon) at the time of slope descending due to clutch disengagement can be prevented. An alternative hydraulic characteristic employed as the steering static characteristic for slopes is as shown in FIG. 5(b) in which oil pressure for starting clutch disengagement (indicated by Point b in FIG. 3(a)) and oil pressure for starting brake actuation (indicated by Point c in FIG. 3(a)) are set to be lower than those of the characteristic (indicated by chain line) shown in FIG. 5(a). With this hydraulic characteristic, clutching force and braking force can be so corrected as to increase and therefore, when driving on a slope, the operator can carry out vehicle steering operation with steering feeling similar to the feeling when driving on a flat place.

Step S5: If the vehicle is not in the slope descending state with a slope angle no less than the predetermined value, it is then determined whether the vehicle is in a forward driving state (i.e., dozing state) in which great tractive force occurs, by judging whether the calculated tractive force of the vehicle is no less than a predetermined value (e.g., 0.4W (W is the weight of the vehicle)).

Figure 6:
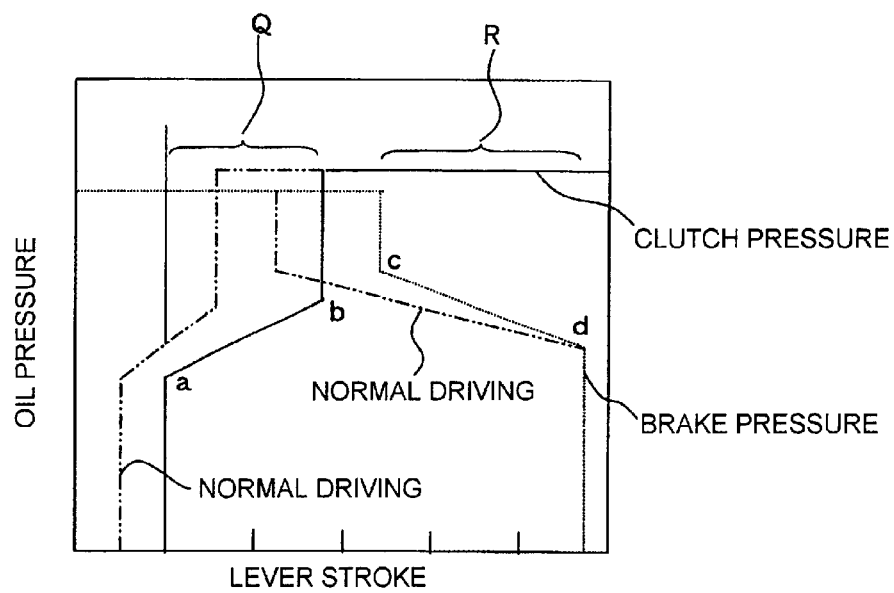
FIG. 6 is a graph showing a steering static characteristic for dozing.

Step S6: If the vehicle is in the high-load, forward driving state with a tractive force which is no less than the predetermined value (e.g., 0.4W (W is the weight of the vehicle)), a steering static characteristic for dozing is selected as the modulation characteristic of a clutch and a brake, in view of the fact that the torque required for turning the inner crawler belt has a plus value when the vehicle is in such a state. This steering static characteristic for dozing is such a characteristic as shown in FIG. 6 in which the controlling region Q of a clutch is increased and the controlling region R of a brake is reduced, compared to those of the characteristic (indicated by chain line) of normal driving. In other words, the steering static characteristic for dozing is obtained by shifting Points b and c of the characteristic shown in FIG. 3(a) to the right. In this way, the half engaged clutch condition with the turning torque of the inner crawler belt having a plus value continues for long, so that even when dozing operation is performed, soil pushing by the front face of the blade can be easily carried out, which provides an optimum turning characteristic without shocks.

Step S7: If the vehicle is not in the forward driving state with great tractive force, it is then determined from the opening of the throttle whether the engine is rotating at a low speed.

Figure 7:
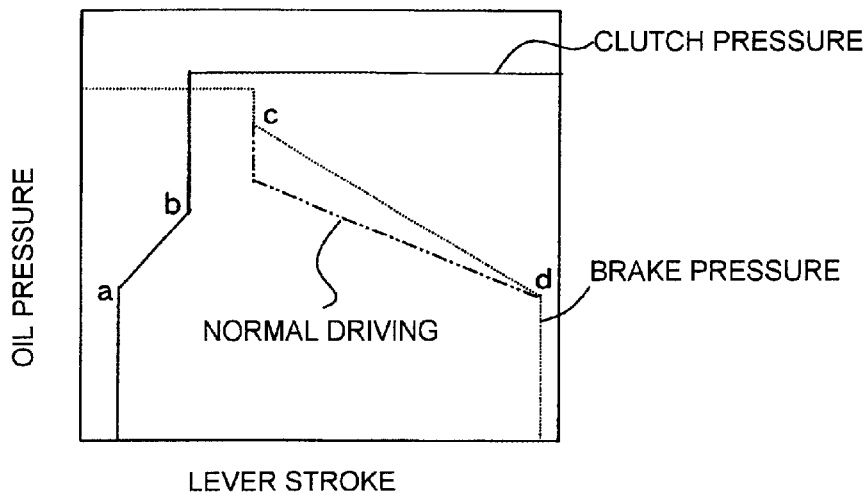
FIG. 7 is a graph showing a steering static characteristic for low engine speed.

Step S8: If the engine is rotating at a low speed, the turning torque may be small and therefore such a steering static characteristic for low engine speed as shown in FIG. 7 will be selected in which oil pressure for starting brake actuation is set higher than that of the characteristic for normal driving (indicated by chain line) thereby reducing braking force. Thus, the prompt brake characteristic allows accurate steering control suited for fine operation.

Step S9: If the vehicle is neither in the slope descending state, nor in the high load driving state, nor in the low engine speed state, the basic steering static characteristic shown in FIG. 3(a) is selected.

Step S10: It is then determined from the calculated pitch angle whether the vehicle is in a slope ascending state where the vehicle is ascending a slope having a predetermined angle (e.g., 6 degrees) or more.

Step S11: If the vehicle is not in the slope ascending state with a slope angle no less than the predetermined value, it is then determined whether the vehicle is in the high-load, forward driving state in which a great tractive force no less than a predetermined value (e.g., 0.4W (W is the weight of the vehicle)) occurs.

Figure 8:
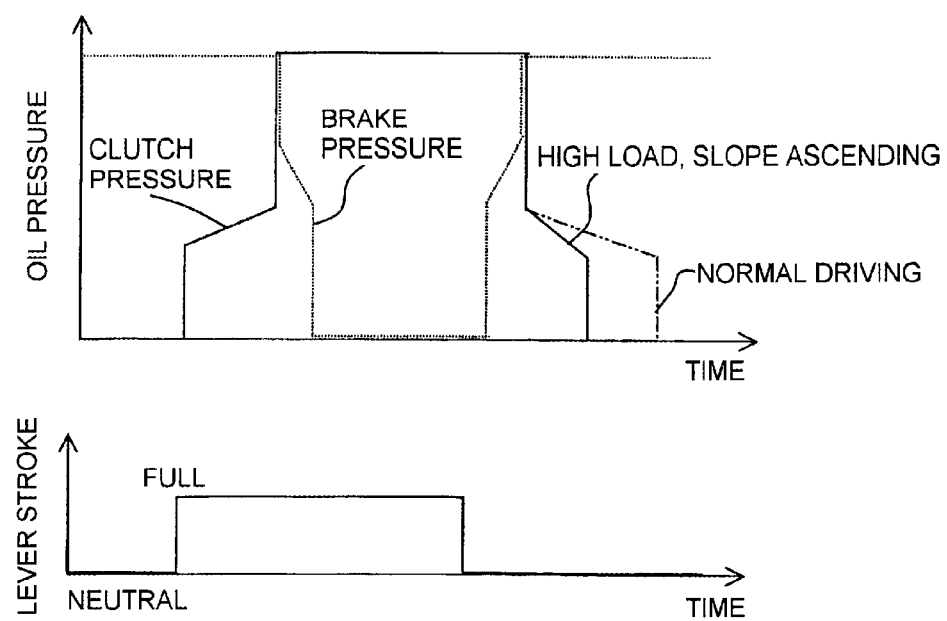
FIG. 8 is a graph showing a steering dynamic characteristic for high load.

Step S12: If the vehicle is in the slope ascending state with a slope angle no less than the predetermined angle or in the high-load, forward driving state (i.e., dozing state) with a great tractive force no less than the predetermined value (e.g., 0.4W (W is the weight of the vehicle)), a steering dynamic characteristic parameter for high load is selected. Specifically, such a characteristic as shown in FIG. 8 is selected, in which when the steering lever is shifted from its full stroke position to its neutral position, the time-relating change rate of clutch oil pressure during the time from a start of clutch engagement to a completion of the clutch engagement is set to be higher than that of normal driving (indicated by chain line) so that clutch engagement can be carried out in a short time. Thus, torque does not discontinue when the vehicle is in the high load driving state. Further, when the vehicle is in the slope ascending state, the reverse steering phenomenon does not occur and shocks which would occur when shifting from the turning state to the straight-ahead driving state can be reduced to ensure a smooth turning characteristic without inertial turning.

Step S13: If the vehicle is neither in the slope ascending state with a slope angle no less than the predetermined value nor in the high load, forward driving state with a tractive force no less than the predetermined value, it is then determined from the calculated vehicle speed whether the vehicle is in a high speed driving state.

Step S14: If the vehicle is in the high speed driving state, a steering dynamic characteristic parameter for high speeds is selected. Specifically, the characteristic as shown in FIG.

9 is selected, in which when shifting the steering lever from its full stroke position to its neutral position, the time-relating change rate of clutch oil pressure during the time from a start of clutch engagement to a completion of the clutch engagement is set to be lower than that of normal driving (indicated by chain line) so that clutch engagement can be gradually carried out. With this arrangement, shocks, which would occur owing to the inertia of the vehicle when shifting from the turning state to the straight-ahead driving state, can be reduced and a smooth turning characteristic without inertial turning can be obtained.

Figure 9:
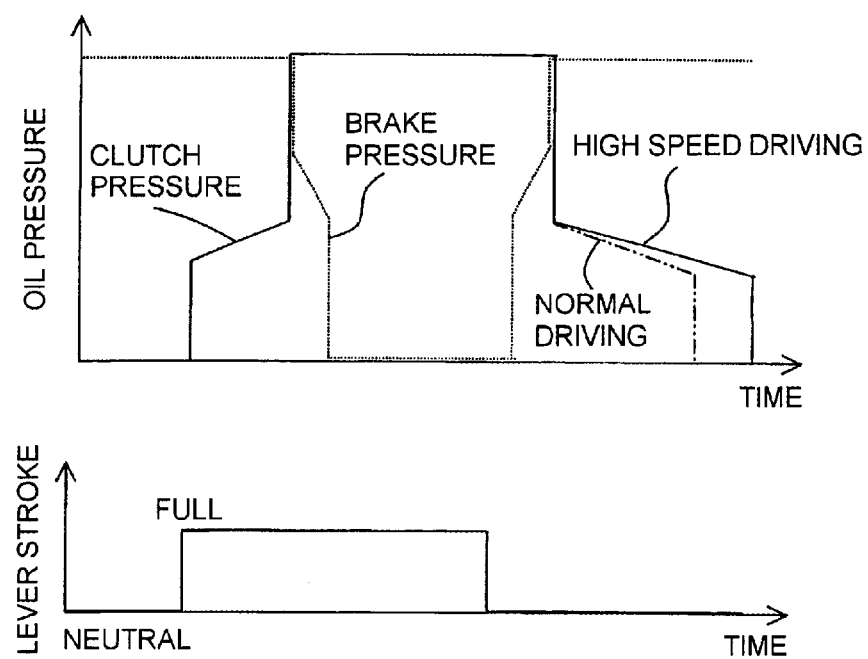
FIG. 9 is a graph showing a steering dynamic characteristic for high speed driving.

Step S15: If the vehicle is not in the high speed driving state, the basic steering dynamic characteristic parameter for normal driving (indicated by chain line in FIGS. 8 and 9) is selected.

Steps S16 and S17: Clutch oil pressure and brake oil pressure are calculated according to a steering lever stroke command. Then, an oil pressure command signal is output to the right and left clutches 26L, 26R through the electromagnetic proportional control valves 30L, 30R and to the right and left brakes 27L, 27R through the electromagnetic proportional control valves 31L, 31R. Thereafter, the flow returns to Step S1.

As has been described, in the present embodiment, an optimum steering static characteristic or optimum steering dynamic characteristic can be selected in accordance with various operating conditions such as slope traveling, dozing operation, low engine speed driving, and high speed driving, so that a bulldozer having steering performance which is free from steering shocks and matches the feeling of the operator can be obtained.

Figure 5:
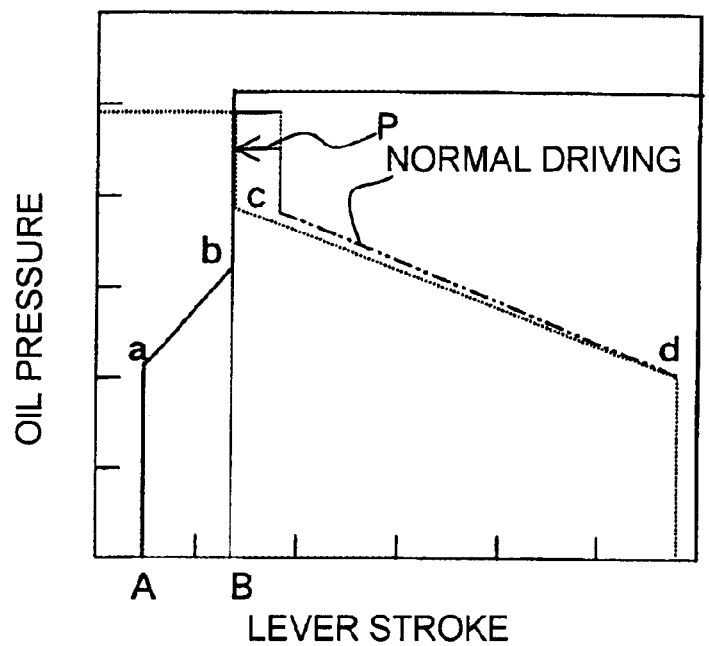
FIGS. 5(a) and 5(b) are graphs each showing a steering static characteristic for slopes.
Figure 5:
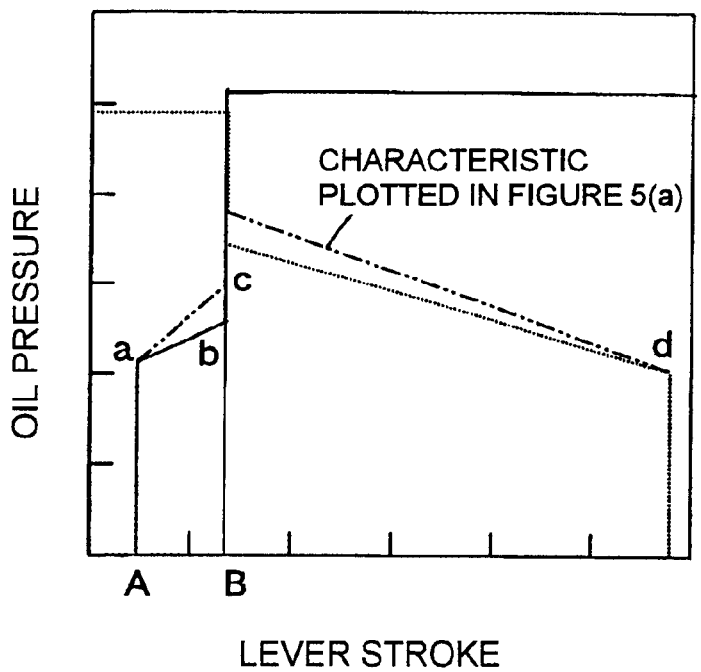

Although the characteristic shown in FIG. 5 is selected as the steering static characteristic for slope descending in the present embodiment, it is possible to select this characteristic when the vehicle is ascending a slope. This makes it possible to avoid such an undesirable situation that the turning radius of the vehicle is excessively increased when the vehicle is ascending a slope.

Although the invention is applied to a bulldozer in the present embodiment, it is obvious that the invention is applicable to other types of tracklaying vehicles.

What is claimed is:

1. A steering control system for a tracklaying vehicle comprising a spring actuated clutch and a spring actuated brake provided for each of right and left drive wheels, electronic proportional control valves for controlling the clutches and the brakes by controlling oil pressure to release the energizing force of the springs, a steering lever, a steering command signal generator for generating a steering command signal according to the operating amount of the steering lever, and a controller for outputting a steering control signal to the electronic proportional control valves based on the output of the steering command signal generator, and a tractive force detecting means for detecting the tractive force of the vehicle, wherein if the tractive force detecting means determines that the vehicle is in a high load driving state, the controller outputs a steering control signal to the electronic proportional control valves in order to obtain a hydraulic characteristic for expanding the region of a clutch in which a clutch oil pressure changes continuously in relation to changes of the lever stroke and reducing the region of a brake in which a brake oil pressure changes continuously in relation to changes of the lever stroke.

2. A steering control system for a tracklaying vehicle comprising a spring actuated clutch and a spring actuated brake provided for each of right and left drive wheels, electronic proportional control valves for controlling the clutches and the brakes by controlling oil pressure to release the energizing force of the springs, a steering lever, a steering command signal generator for generating a steering command signal according to the operating amount of the steering lever, and a controller for outputting a steering control signal to the electronic proportional control valves based on the output of the steering command signal generator, and pitch angle detecting means for detecting the pitch forward or pitch aft angle of the vehicle, wherein if the pitch angle detecting means determines that the vehicle is moving uphill or downhill, the controller outputs a steering control signal to the electronic proportional control valves in order to inhibit simultaneous release of a clutch and a brake.

3. A steering control system for a tracklaying vehicle according to claim 2, wherein if the pitch angle detecting means determines that the vehicle is in a slope traveling state, the controller outputs a steering control signal to the electronic proportional control valves to obtain a hydraulic characteristic in which the values of an oil pressure for starting clutch disengagement and oil pressure for starting brake actuation are set to be lower.

4. A steering control system for a tracklaying vehicle comprising a spring actuated clutch and a spring actuated brake provided for each of right and left drive wheels, electronic proportional control valves for controlling the clutches and the brakes by controlling oil pressure to release the energizing force of the springs, a steering lever, a steering command signal generator for generating a steering command signal according to the operating amount of the steering lever, and a controller for outputting a steering control signal to the electronic proportional control valves based on the output of the steering command signal generator, and rotation detecting means for detecting the rotational speed of an engine or a torque converter, wherein if the rotation detecting means determines that the engine is in a low speed rotating state, the controller outputs a steering control signal to the electronic proportional control valves in order to set the value of oil pressure for starting brake actuation to be higher than when a low speed rotating state is not detected.

5. A steering control system for a tracklaying vehicle comprising a spring actuated clutch and a spring actuated brake provided for each of right and left drive wheels, electronic proportional control valves for controlling the clutches and the brakes by controlling oil pressure to release the energizing force of the springs, a steering lever, a steering command signal generator for generating a steering command signal according to the operating amount of the steering lever, and a controller for outputting a steering control signal to the electronic proportional control valves based on the output of the steering command signal generator, steering dynamic characteristic parameters for a high load driving state, tractive force detecting means for detecting the tractive force of the vehicle and pitch angle detecting means for detecting the pitch forward or pitch aft angle of the vehicle, wherein if the tractive force detecting means determines a great tractive force indicating that the vehicle is in a high load driving state or the pitch angle detecting means determines that the vehicle is in a slope ascending state, the controller outputs a steering control signal to the electronic proportional control valves in order to obtain a characteristic based on said parameters for setting the time-relating change rate of clutch oil pressure after a start of clutch engagement until completion of the clutch engagement to be higher than that when a low load driving state is detected or it is determined that the vehicle is not in a slope traveling state, during the operation of shifting the steering lever from its full stroke position to its neutral position.

6. A steering control system for a tracklaying vehicle comprising a spring actuated clutch and a spring actuated brake provided for each of right and left drive wheels, electronic proportional control valves for controlling the clutches and the brakes by controlling oil pressure to release the energizing force of the springs, a steering lever, a steering command signal generator for generating a steering command signal according to the operating amount of the steering lever, and a controller for outputting a steering control signal to the electronic proportional control valves based on the output of the steering command signal generator, steering dynamic characteristic parameters for high speed driving, vehicle speed detecting means for detecting means for detecting the driving speed of the vehicle, wherein if the vehicle speed detecting means determines that the vehicle is in a high speed driving state, the controller outputs a steering control signal to the electronic proportional control valves in order to obtain a characteristic based on said parameters for setting the time-relating change rate of clutch oil pressure after a start of clutch engagement until completion of the clutch engagement, to be lower than when the speed detecting means determines that the vehicle is not in a high speed driving state, during the operation of shifting the steering lever form its full stroke position to its neutral position.

* * * * *